(12) United States Patent
Wang

(10) Patent No.: US 6,363,699 B1
(45) Date of Patent: Apr. 2, 2002

(54) SPATIAL GUIDE AND SUPPORT FOR ATTACHMENT TO A LINE TRIMMER

(75) Inventor: Tsan-Ching Wang, Changhua (TW)

(73) Assignee: Yao I Fabric Co., Ltd., Changhua (TW)

( * ) Notice: Subject to any disclaimer, the term of this patent is extended or adjusted under 35 U.S.C. 154(b) by 0 days.

(21) Appl. No.: 09/576,524

(22) Filed: May 23, 2000

(51) Int. Cl.⁷ .................. A01D 34/416; A01D 34/84
(52) U.S. Cl. ................ 56/12.7; 56/17.1; 56/17.4
(58) Field of Search .................. 56/12.7, 16.7, 56/17.1, 17.2, 17.4, 17.5, 320.1; 30/DIG. 5, 276

(56) References Cited

U.S. PATENT DOCUMENTS

| | | | | |
|---|---|---|---|---|
| 2,942,397 A | * | 6/1960 | Clark | 56/17.5 |
| 4,756,148 A | * | 7/1988 | Gander et al. | 56/17.2 |
| 5,029,435 A | * | 7/1991 | Buchanan | 56/12.1 |
| 5,092,112 A | * | 3/1992 | Buckendorf, Jr. | 54/17.5 |
| 5,107,665 A | * | 4/1992 | Wright | 56/12.7 |
| 5,303,532 A | * | 4/1994 | Phillips | 56/12.7 |
| 5,450,715 A | * | 9/1995 | Murray | 56/16.9 |

FOREIGN PATENT DOCUMENTS

| | | | | |
|---|---|---|---|---|
| EP | | 222515 | * 5/1987 | 56/17.5 |

* cited by examiner

Primary Examiner—Thomas B. Will
Assistant Examiner—Meredith C. Petravick
(74) Attorney, Agent, or Firm—Rosenberg, Klein & Lee

(57) ABSTRACT

A spatial guide and support for attachment to a line trimmer includes a rotatable cutter head having a lawn cutting string mounted thereon and a main shaft extending upward therefrom, a moving member mounted on the main shaft of the cutter head for moving the cutter head and having a fastener secured on the main shaft of the cutter head, an auxiliary member mounted on the main shaft of the cutter head and having a mounting bracket rotatably mounted on the fastener of the moving member, a guide track secured on the mounting bracket, and an auxiliary moving wheel adjustably mounted on the guide track, and an adjusting member mounted on the mounting bracket of the auxiliary member for releasably securing the mounting bracket on the fastener of the moving member.

9 Claims, 8 Drawing Sheets

SPATIAL GUIDE AND SUPPORT FOR ATTACHMENT TO A LINE TRIMMER

BACKGROUND OF THE INVENTION

Field of the Invention

The present invention relates to a spatial guide and support for attachment to a line trimmer.

DESCRIPTION OF THE RELATED ART

A conventional line trimmer 60 in accordance with the prior art shown in FIG. 9 comprises a handle 61, a support rod 63, a roller 64, a rotatable cutter head 62, and a cutting string 621. However, the cutting string 621 cannot exactly align with the cutting line of the lawn so that the cutting string 621 easily cuts expensive plant when it is cutting weeds around the plant. In addition, when the conventional line trimmer 60 is used to trim the weeds adjacent to a step of the house, the cutting string 621 easily strikes the step, thereby wearing the cutting string 621. Further, the conventional line trimmer 60 cannot be used to perform an upright cutting and trimming function.

The closest prior arts of which the applicant is aware are disclosed in the following patent documents:

1. U.S. Pat. No. 4,922,694 to Emoto.
2. U.S. Pat. No. 4,981,012 to Clabom.
3. U.S. Pat. No. 5,095,687 to Andrew et al.
4. U.S. Pat. No. 5,107,665 to Wright.
5. U.S. Pat. No. 5,317,807 to Pulley.
6. U.S. Pat. No. 5,940,973 to Kitz.
7. U.S. Pat. No. 5,996,234 to Fowler et al.

SUMMARY OF THE INVENTION

In accordance with one aspect of the present invention, there is provided a spatial guide and support for attachment to a line trimmer comprising a rotatable cutter head including a lawn cutting string mounted thereon and a main shaft extending upward therefrom; a moving member mounted on the main shaft of the cutter head for moving the cutter head and including a fastener secured on the main shaft of the cutter head; an auxiliary member mounted on the main shaft of the cutter head and including a mounting bracket rotatably mounted on the fastener of the moving member, a guide track secured on the mounting bracket, and an auxiliary moving wheel adjustably mounted on the guide track; and an adjusting member mounted on the mounting bracket of the auxiliary member for releasably securing the mounting bracket on the fastener of the moving member.

The fastener of the moving member includes a first clamping block mounted on the main shaft, and a second clamping block secured to the first clamping block with the main shaft secured between the first clamping block and the second clamping block. The first clamping block has two sides each provided with an arcuate first piece transversely defining an elongated slide groove, and the second clamping block has two sides each provided with an elongated rib secured in the slide groove, and an arcuate second piece extending from the second clamping block and mating with the first piece of the first clamping block.

The first piece of each of the two sides of the first clamping block defines a plurality of first positioning holes, the second piece of the second clamping block defines a plurality of second positioning holes mating with the first positioning holes, the auxiliary member further includes an upright support post secured on the mounting bracket to rotate therewith and defining an insertion hole, and the adjusting member includes a press plug secured on a top portion of the support post, a control rod slidably mounted in the insertion hole of the support post and having an upper end extending through the press plug and defining a through bore, a mediate portion provided with an annular shoulder, and a lower end detachably inserted into one of the first positioning holes and the second positioning holes, a pull ring secured to the through bore of the control rod, and a biasing member mounted on the control rod and biased between the annular shoulder and the press plug.

In operation, the pull ring can be moved upward to move the control rod upward, thereby detaching the lower end of the control rod from the second positioning hole so that the mounting bracket is rotatable relative to the second piece of the second clamping block. In such a manner, the guide track together with the auxiliary moving wheel can be rotated with the mounting bracket so that the angle of the auxiliary moving wheel can be adjusted so as to efficiently achieve a lawn trimming function.

The guide track has two sides each defining a plurality of positioning slots, and the auxiliary moving wheel includes two elastic strips each slidably mounted in the guide track and each having an outer side provided with an insertion block detachably received in one of the positioning slots of a respective one of the two sides of the guide track and an inner side provided with a press block protruding upward.

An object of the present invention is to provide an auxiliary moving wheel whose angle and length can be properly and easily adjusted according the user's stature, thereby efficiently achieving the lawn trimming effect.

Another object of the present invention is to provide an auxiliary moving wheel which can move along the edge of the step or the plant so that the lawn cutting string can easily cut the weeds along the edge of the step or the plant without a possibility of cutting the plant or wearing the lawn cutting string by the step, thereby efficiently protecting the plant and the lawn cutting string.

A further object of the present invention is to provide an auxiliary moving wheel which can provide a slidable and alignable function so that the lawn cutting string aligns with the auxiliary moving wheel without incurring deviation, thereby preventing the lawn cutting string from cutting the plant.

A further object of the present invention is to provide an auxiliary moving wheel which can be moved on the lawn for supporting the moving member and the cutter head so that the lawn cutting string can be used to perform an upright cutting and trimming function.

Further benefits and advantages of the present invention will become apparent after a careful reading of the detailed description with appropriate reference to the accompanying drawings.

DETAILED DESCRIPTION OF THE INVENTION

Figure 1:
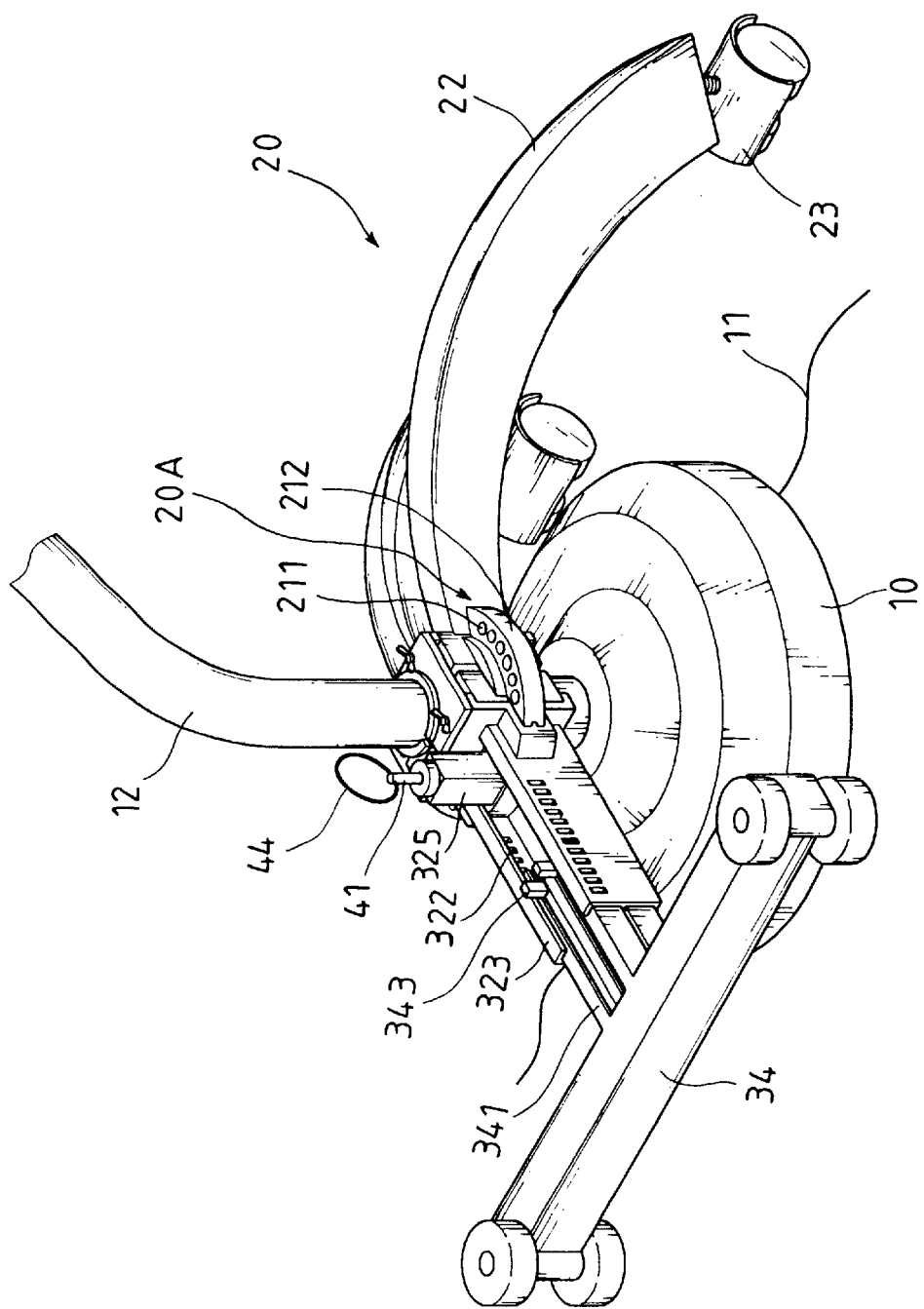
FIG. 1 is a perspective view of a spatial guide and support for attachment to a line trimmer in accordance with the present invention.

Referring to the drawings and initially to FIGS. 1–4, a spatial guide and support for attachment to a line trimmer in accordance with the present invention comprises a rotatable cutter head 10 including a lawn cutting string 11 mounted thereon and a main shaft 12 extending upward therefrom, a moving member 20 mounted on the main shaft 12 of the cutter head 10 for moving the cutter head 10 and including a fastener 20A secured on the main shaft 12 of the cutter head 10, an auxiliary member 30 mounted on the main shaft 12 of the cutter head 10 and including a mounting bracket 32 rotatably mounted on the fastener 20A of the moving member 20, a guide track 323 secured on the mounting bracket 32, and an auxiliary moving wheel 34 adjustably mounted on the guide track 323, and an adjusting member 40 mounted on the mounting bracket 32 of the auxiliary member 30 for releasably securing the mounting bracket 32 on the fastener 20A of the moving member 20.

The fastener 20A of the moving member 20 includes a first clamping block 21 mounted on the main shaft 12, and a second clamping block 25 secured to the first clamping block 21 with the main shaft 12 secured between the first clamping block 21 and the second clamping block 25.

The moving member 20 further includes two spaced extension legs 22 each having a first end secured to the first clamping block 21 and a second end provided with a roller 23, and a guard plate 24 secured between the two extension legs 22 for protecting the user.

The mounting bracket 32 of the auxiliary member 30 includes a retaining plate 35 mounted on the main shaft 12 and abutting a top portion of the first clamping block 21 and the second clamping block 25, a locking piece 33 secured to the retaining plate 35 with the main shaft 12 located between the retaining plate 35 and the locking piece 33, and a sleeve 36 mounted on the main shaft 12 and located in the first clamping block 21 and the second clamping block 25 for bearing between the main shaft 12, the first clamping block 21 and the second clamping block 25.

The first clamping block 21 has two sides each provided with an arcuate first piece 212 transversely defining an elongated slide groove 213. The second clamping block 25 has two sides each provided with an elongated rib 251 secured in the slide groove 213, and an arcuate second piece 252 extending from the second clamping block 25 and mating with the first piece 212 of the first clamping block 21. The mounting bracket 32 of the auxiliary member 30 defines an arcuate groove 321 for receiving the second piece 252 of the second clamping block 25.

The first piece 212 of each of the two sides of the first clamping block 21 defines a plurality of first positioning holes 211 arranged in a curved manner. The second piece 252 of the second clamping block 25 defines a plurality of second positioning holes 253 arranged in a curved manner and mating with the first positioning holes 211. The auxiliary member 30 further includes an upright support post 325 secured on the mounting bracket 32 to rotate therewith and defining an insertion hole 324.

Figure 2:
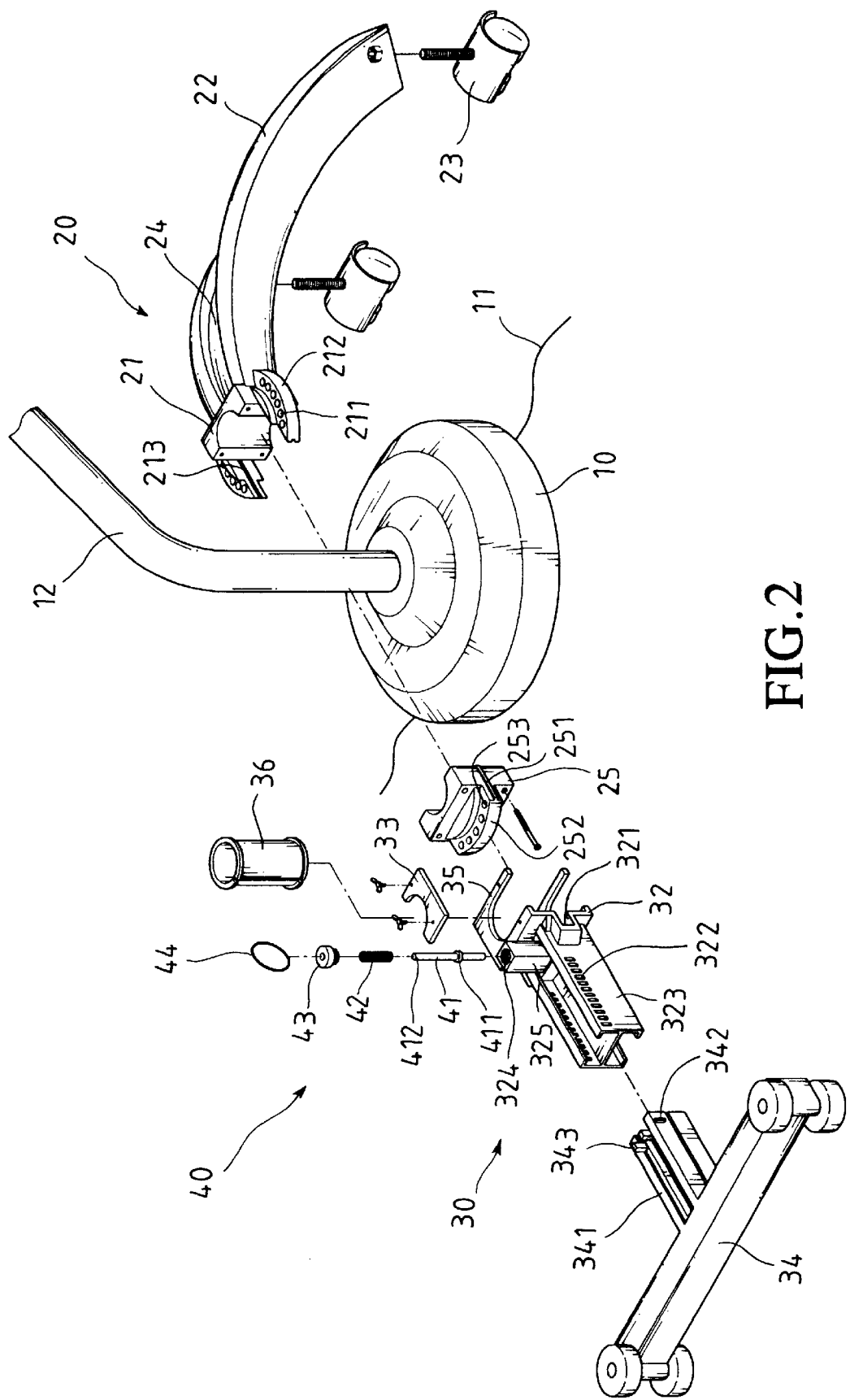
FIG. 2 is an exploded view of the spatial guide and support for attachment to a line trimmer as shown in FIG. 1.
Figure 4:
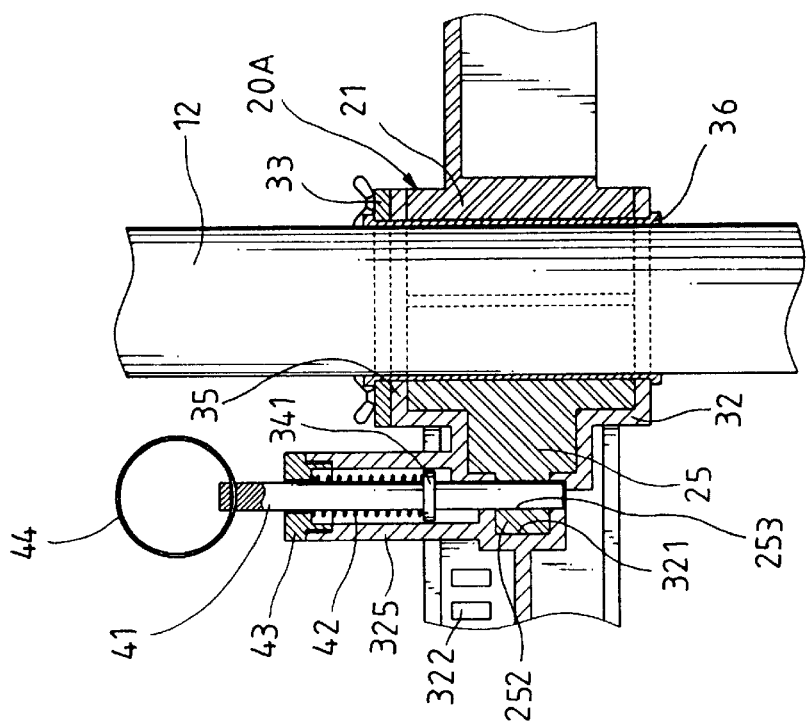
FIG. 4 is an enlarged cross-sectional view of the spatial guide and support for attachment to a line trimmer as shown in FIG. 3.
Figure 3:
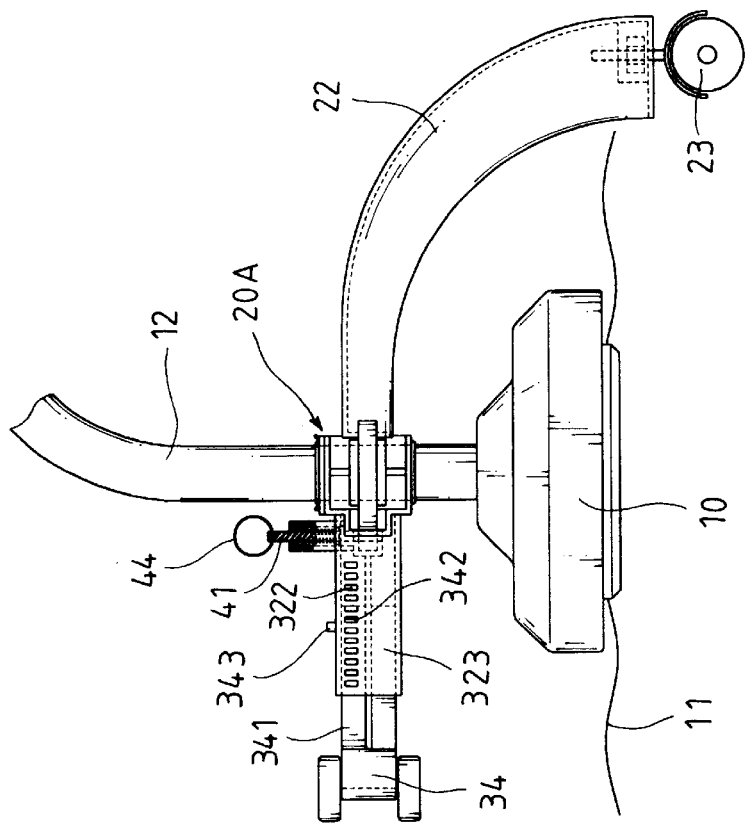
FIG. 3 is a side plan view of the spatial guide and support for attachment to a line trimmer as shown in FIG. 1.

As shown in FIGS. 2 and 4, the adjusting member 40 includes a press plug 43 secured on a top portion of the support post 325, a control rod 41 slidably mounted in the insertion hole 324 of the support post 325 and having an upper end extending through the press plug 43 and defining a through bore 412, a mediate portion provided with an annular shoulder 411, and a lower end detachably inserted into one of the first positioning holes 211 and the second positioning holes 253, a pull ring 44 secured to the through bore 412 of the control rod 41, and a biasing member 42, such as a spring, mounted on the control rod 41 and biased between the annular shoulder 411 and the press plug 43.

The lower end of the control rod 41 can be detachably received in one of the second positioning holes 253 of the second piece 252 of the second clamping block 25 so that the mounting bracket 32 is secured on the second clamping block 25. Alternatively, the lower end of the control rod 41 can also be detachably received in one of the first positioning holes 211 of the first piece 212 of the first clamping block 21 so that the mounting bracket 32 is secured on the first clamping block 21.

The guide track 323 includes two sides each defining a plurality of positioning slots 322. The auxiliary moving wheel 34 includes two elastic strips 341 each slidably mounted in the guide track 323 and each having an outer side provided with an insertion block 342 detachably received in one of the positioning slots 322 of a respective one of the two sides of the guide track 323 and an inner side provided with a press block 343 protruding upward.

Figure 5B:
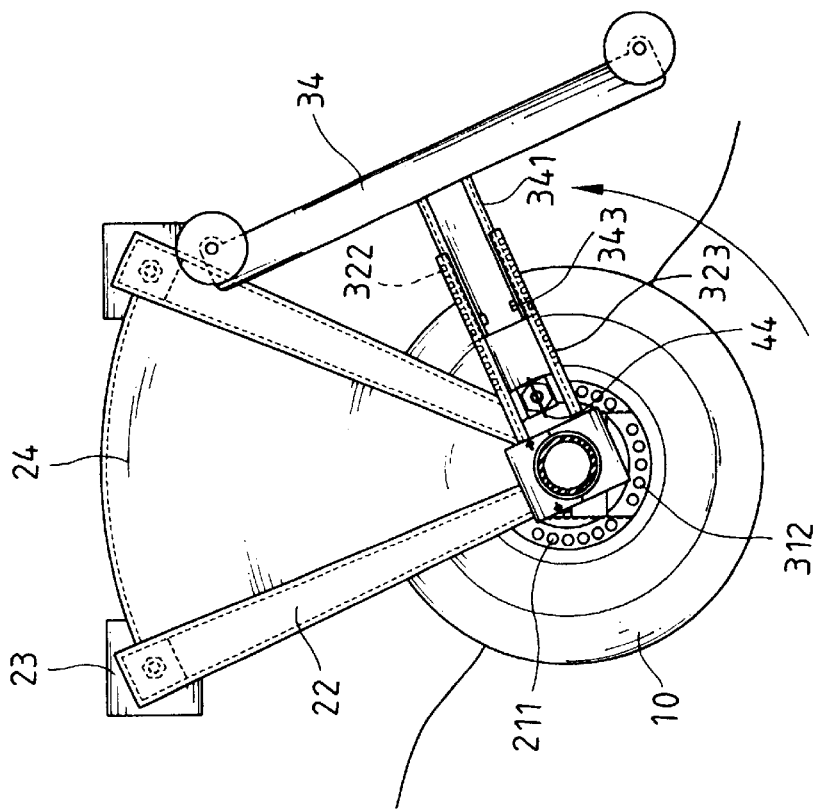
FIG. 5B is an operational view of the spatial guide and support for attachment to a line trimmer as shown in FIG. 5A.
Figure 5A:
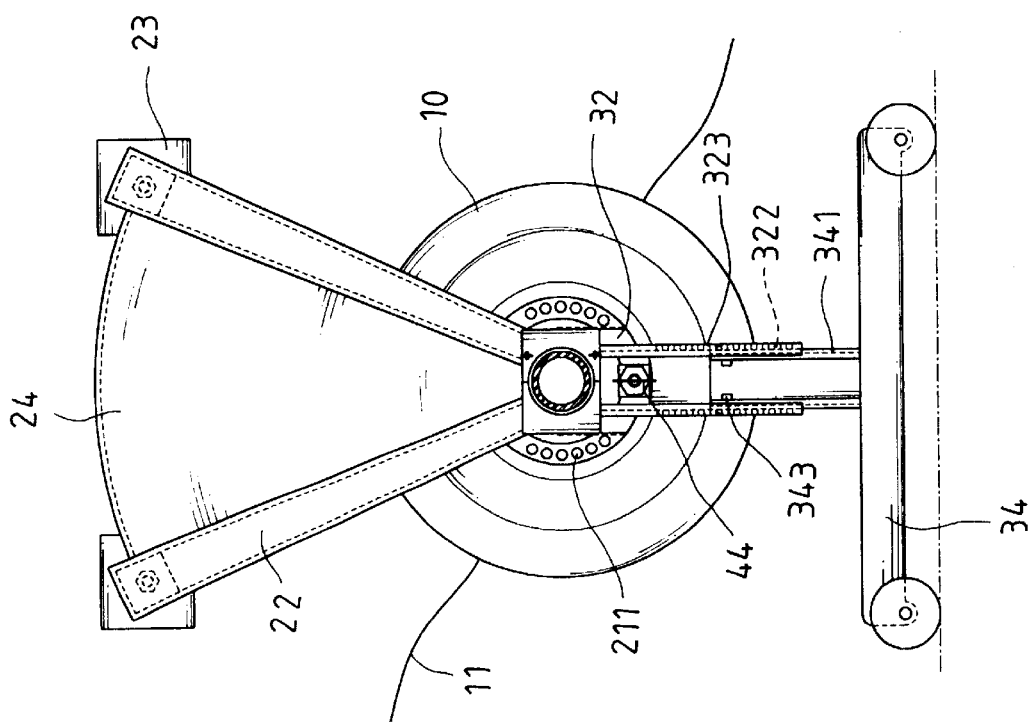
FIG. 5A is a top plan cross-sectional view of the spatial guide and support for attachment to a line trimmer as shown in FIG. 1.

In operation, referring to FIGS. 5A and 5B with reference to FIGS. 1–4, the lower end of the control rod 41 is initially detachably received in one of the second positioning holes 253 of the second piece 252 of the second clamping block 25 so that the mounting bracket 32 is secured on the second clamping block 25 as shown in FIG. 4. The pull ring 44 can then be moved upward to move the control rod 41 upward, thereby detaching the lower end of the control rod 41 from the second positioning hole 253 so that the mounting bracket 32 is rotatable relative to the second piece 252 of the second clamping block 25.

In such a manner, the guide track 323 together with the auxiliary moving wheel 34 can be rotated with the mounting bracket 32 to move from the position as shown in FIG. 5A to the position as shown in FIG. 5B so that the angle of the auxiliary moving wheel 34 can be adjusted arbitrarily.

When the force exerted on the pull ring 44 is removed, the lower end of the control rod 41 is moved downward by the restoring force of the biasing member 42 to be received in one of the first positioning holes 211 of the first piece 212 of the first clamping block 21 so that the mounting bracket 32 is secured on the first clamping block 21, thereby fixing the auxiliary moving wheel 34.

Figure 6:
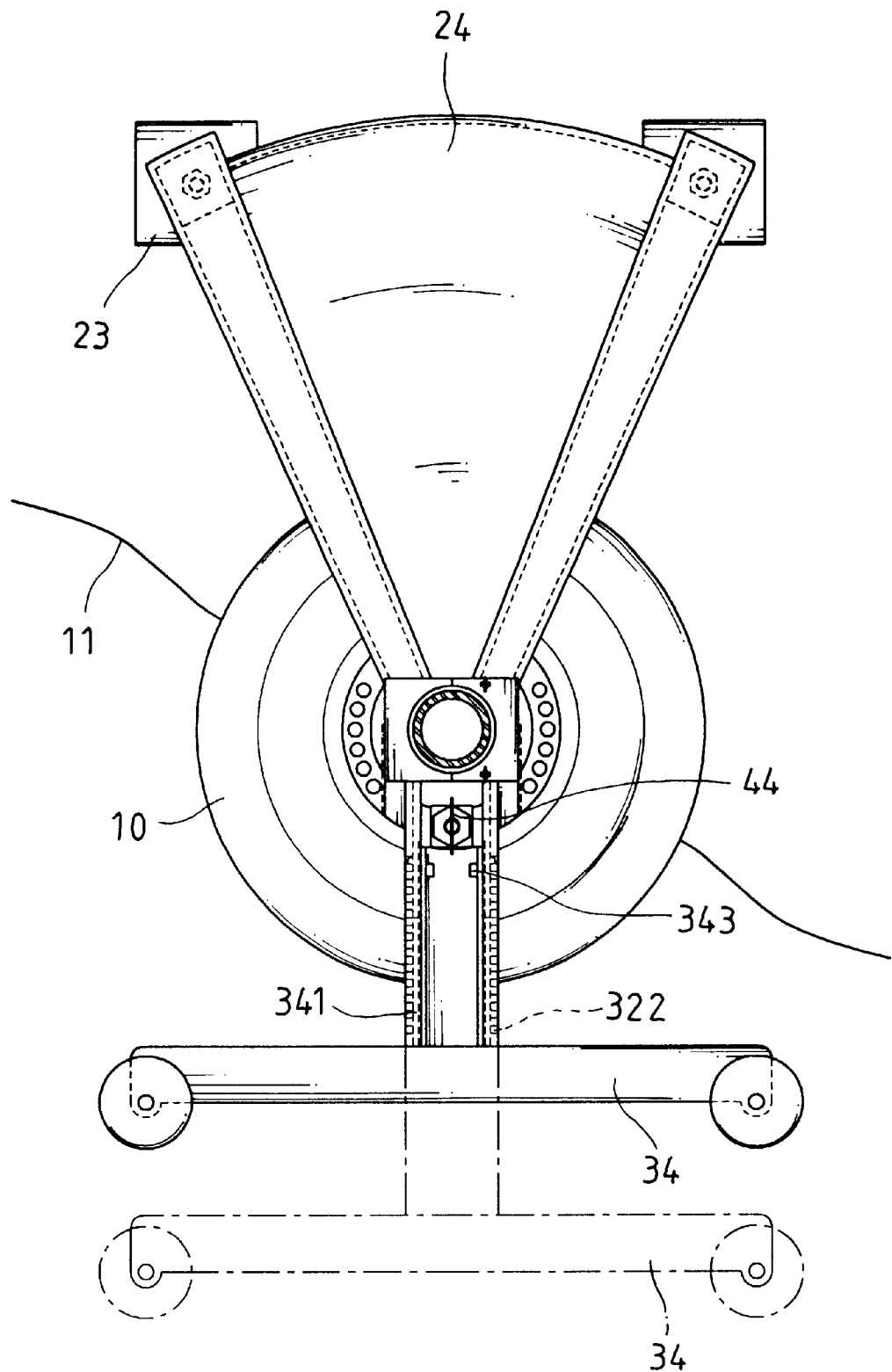
FIG. 6 is an operational view of the spatial guide and support for attachment to a line trimmer as shown in FIG. 5A.

Referring to FIG. 6, the press block 343 of each of the two elastic strips 341 can be pressed to detach the insertion block 342 from the positioning slot 322 of the guide track 323 so that the two elastic strips 341 can be moved in the guide track 323 so that the auxiliary moving wheel 34 can be moved from the position as shown in solid lines to the position as shown in phantom lines, thereby adjusting the position or length of the auxiliary moving wheel 34 to fit the stature of the user.

Accordingly, the angle and length of the auxiliary moving wheel 34 can be properly and easily adjusted, thereby efficiently achieving the lawn trimming effect.

Figure 7B:
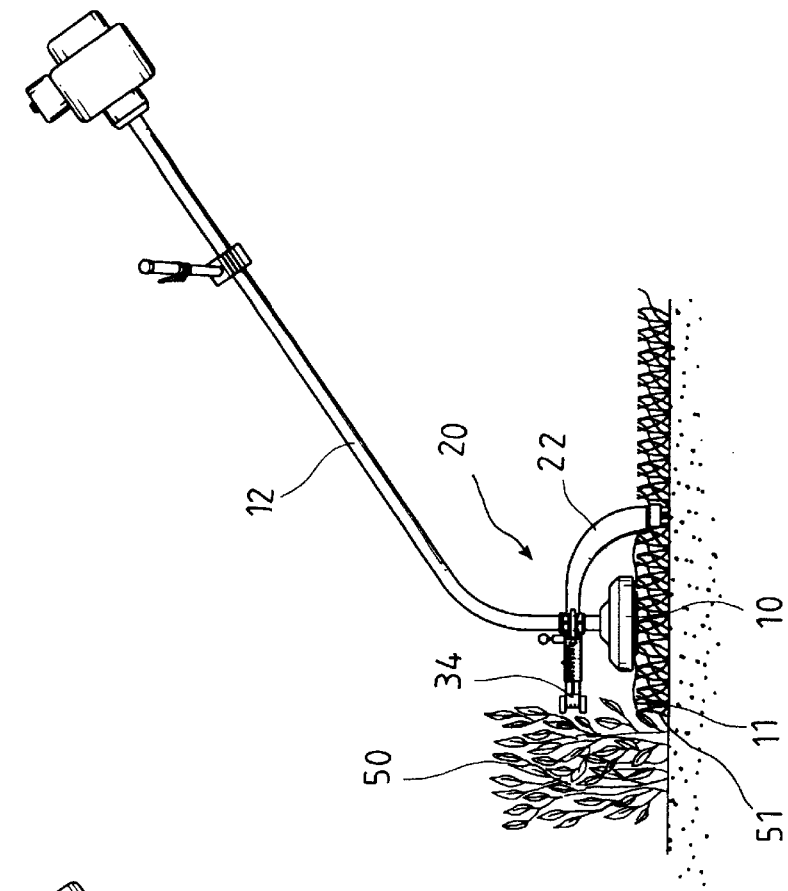
FIG. 7B is a side plan operational view of the spatial guide and support for attachment to a line trimmer as shown in FIG. 1.
Figure 7A:
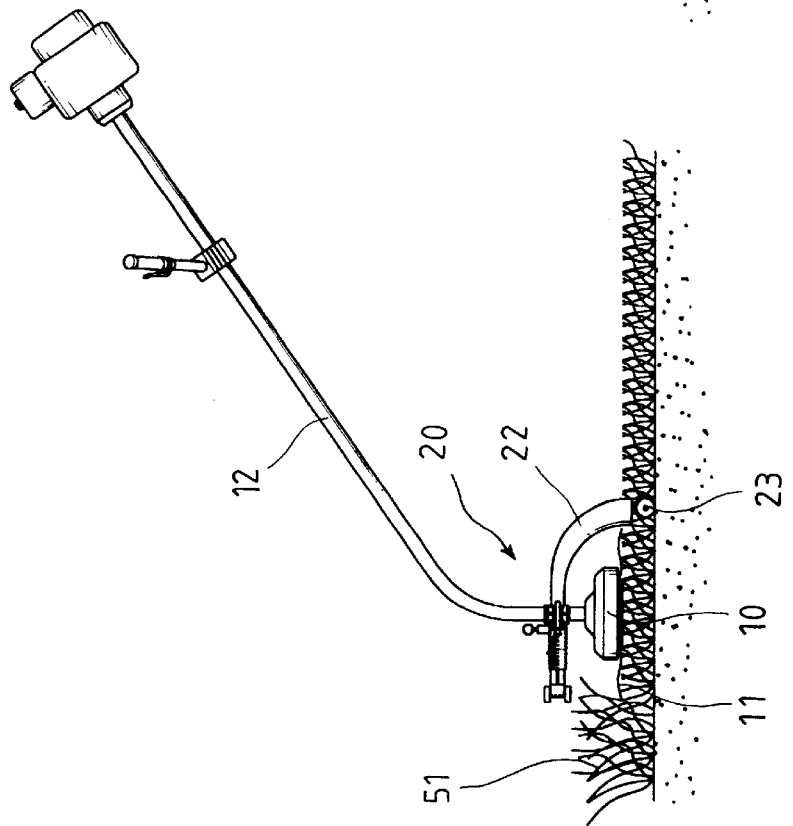
FIG. 7A is a side plan operational view of the spatial guide and support for attachment to a line trimmer as shown in FIG. 1.

Referring to FIG. 7A, the moving member 20 can be moved on the lawn by the rollers 23 so as to move the rotatable cutter head 10 together with the lawn cutting string 11 for achieving a lawn trimming effect.

As shown in FIG. 7B, when the user wants to trim weeds 51 adjacent to a step or a plant 50, the auxiliary moving wheel 34 can be used to move along the edge of the step or the plant 50 so that the lawn cutting string 11 can easily cut the weeds 51 along the edge of the step or the plant 50 without a possibility of cutting the plant 50 or wearing the lawn cutting string 11 by the step, thereby efficiently protecting the plant 50 and the lawn cutting string 11. In addition, the auxiliary moving wheel 34 can provide a slidable and alignable function so that the lawn cutting string 11 can align with the auxiliary moving wheel 34 without incurring deviation, thereby preventing the lawn cutting string 11 from cutting the plant 50.

Figure 8:
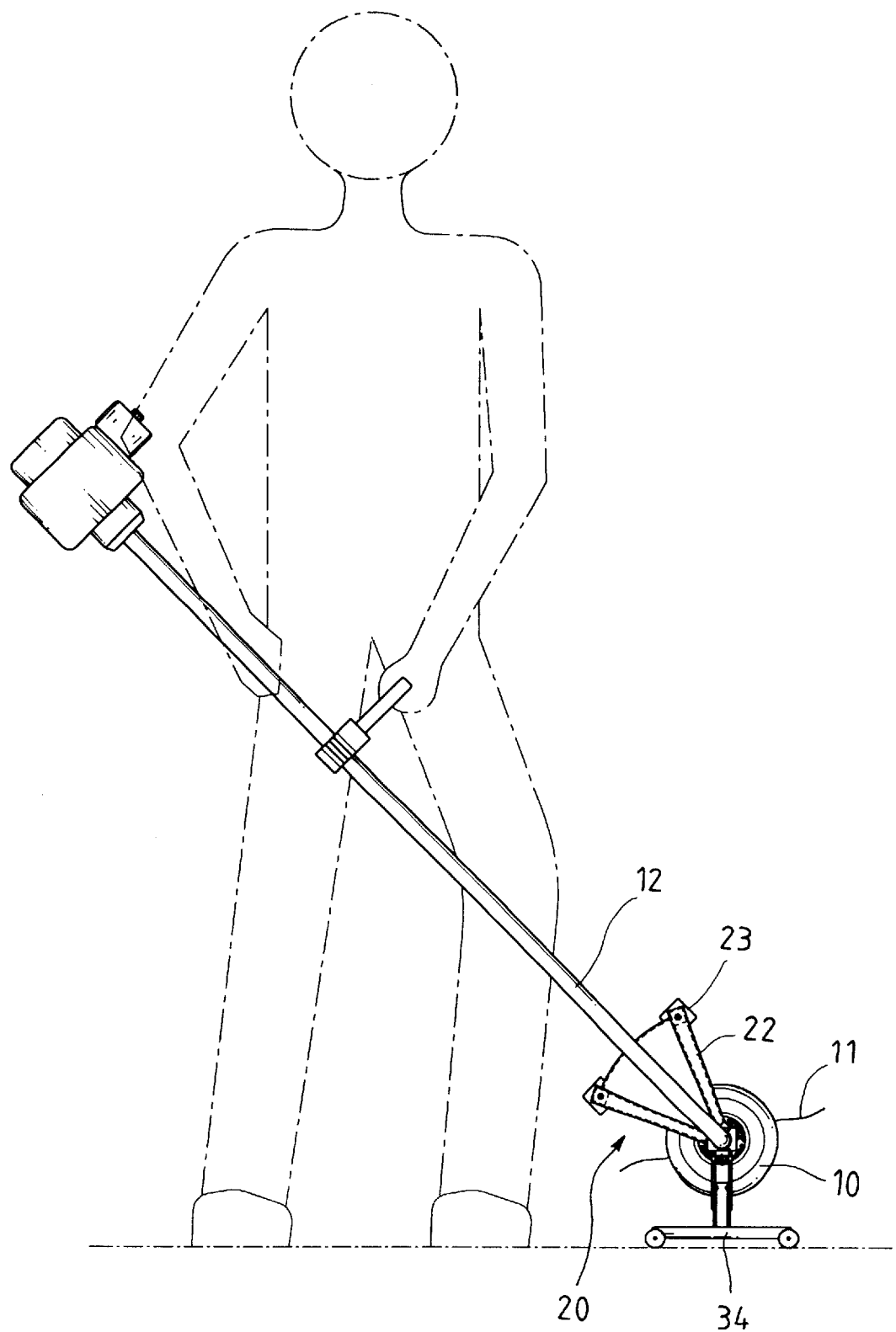
FIG. 8 is a schematic operational view of the spatial guide and support for attachment to a line trimmer as shown in FIG. 1.
Figure 9:
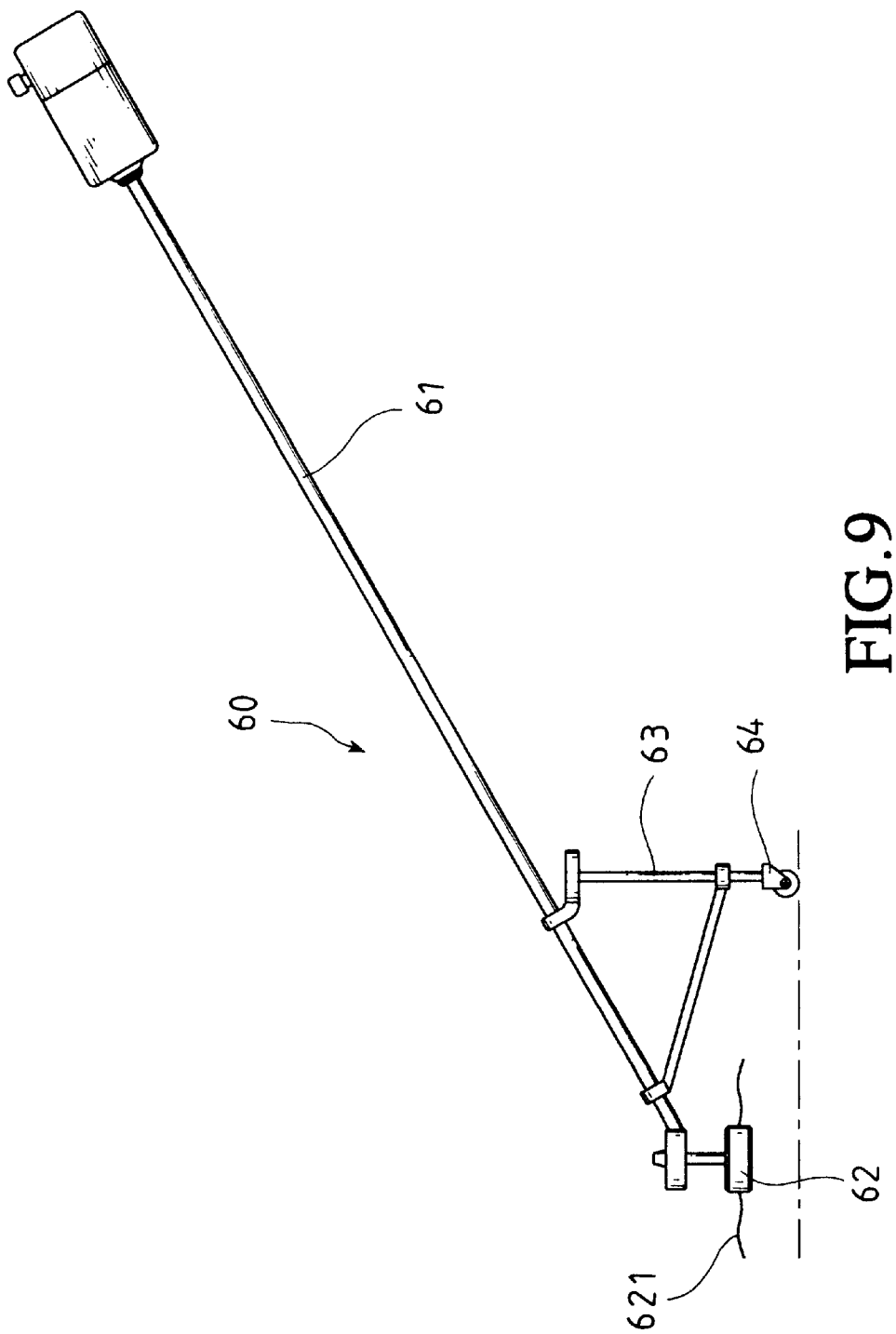
FIG. 9 is a side plan view of a conventional line trimmer in accordance with the prior art.

Referring to FIG. 8, the auxiliary moving wheel 34 is moved on the lawn for supporting the moving member 20 and the cutter head 10 so that the lawn cutting string 11 can be used to perform an upright cutting and trimming function.

It should be clear to those skilled in the art that further embodiments may be made without departing from the scope of the present invention.

What is claimed is:

1. A line trimmer having a spatial guide and support attachment comprising:
 (a) a rotatable cutter head including a lawn cutting string mounted thereon and a main shaft extending upward therefrom;
 (b) a moving member mounted on said main shaft of said cutter head for movably supporting said cutter head and including a fastener secured on said main shaft of said cutter head, said fastener including a first clamping block and a second clamping block secured one to the other about said main shaft disposed therebetween;
 (c) an auxiliary member mounted on said main shaft of said cutter head and including a mounting bracket rotatably mounted on said fastener of said moving member, a guide track secured on said mounting bracket, and an auxiliary moving wheel adjustably mounted on said guide track, said mounting bracket including:
  a retaining plate mounted on said main shaft and abutting top portions of said first and second clamping blocks;
  a locking piece secured to said retaining plate about said main shaft disposed therebetween; and,
  a sleeve mounted on said main shaft and passing between said first and second clamping blocks; and,
 (d) an adjusting member mounted on said mounting bracket of said auxiliary member for releasably securing said mounting bracket to said fastener of said moving member.

2. A line trimmer having a spatial guide and support attachment comprising:
 (a) a rotatable cutter head including a lawn cutting string mounted thereon and a main shaft extending upward therefrom;
 (b) a moving member mounted on said main shaft of said cutter head for movably supporting said cutter head and including a fastener secured on said main shaft of said cutter head, said fastener including a first clamping block and a second clamping block secured one to the other about said main shaft, said first clamping block having a pair of side portions each forming an arcuate first piece transversely defining an elongated slide groove, said second clamping block having a pair of side portions and an arcuate second piece extending therebetween, each said second clamping block side portion forming an elongated rib engaging said slide groove, said arcuate second piece being disposed between said first arcuate pieces of said first clamping block side portions;
 (c) an auxiliary member mounted on said main shaft of said cutter head and including a mounting bracket rotatably mounted on said fastener of said moving member, a guide track secured on said mounting bracket, and an auxiliary moving wheel adjustably mounted on said guide track; and,
 (d) an adjusting member mounted on said mounting bracket of said auxiliary member for releasably securing said mounting bracket to said fastener of said moving member.

3. The line trimmer as recited in claim 2 wherein said mounting bracket of said auxiliary member defines an arcuate groove for receiving said arcuate second piece of said second clamping block.

4. The line trimmer as recited in claim 2 wherein said arcuate first piece of each said side portion of said first clamping block defines a plurality of first positioning holes, and said arcuate second piece of said second clamping block defines a plurality of second positioning holes each aligning with one said first positioning hole; said auxiliary member further including an upright support post secured on said mounting bracket to displace therewith defining an insertion hole.

5. The line trimmer as recited in claim 4 wherein said adjusting member includes:
 a press plug secured to a top portion of said support post; and,
 a control rod slidably engaging said insertion hole of said support post and extending through said press plug, said control rod defining a transversely extended through bore and having a mediate portion forming an annular shoulder, said control rod having a lower end portion selectively engaging one of said first positioning holes and one of said second positioning holes aligned therewith;
 a pull ring secured to said through bore of said control rod; and,
 a biasing member coupled to said control rod for biasing capture between said annular shoulder and said press plug.

6. A line trimmer having a spatial guide and support attachment comprising:
 (a) a rotatable cutter head including a lawn cutting string mounted thereon and a main shaft extending upward therefrom;
 (b) a moving member mounted on said main shaft of said cutter head for movably supporting said cutter head and including a fastener secured on said main shaft of said cutter head;

(c) an auxiliary member mounted on said main shaft of said cutter head and including a mounting bracket rotatably mounted on said fastener of said moving member, a guide track secured on said mounting bracket, and an auxiliary moving wheel adjustably mounted on said guide track, said guide track having a pair of side portions each defining a plurality of positioning slots, said auxiliary moving wheel including a pair of elastic strips each slidably mounted in said guide track, each said elastic strip having a press block protruding upward from an inner side portion thereof and an insertion block protruding from an outer side portion thereof to releasably engage said positioning slot of one said guide track side portion; and, (d) an adjusting member mounted on said mounting bracket of said auxiliary member for releasably securing said mounting bracket to said fastener of said moving member.

7. A line trimmer having a spatial guide and support attachment comprising:

(a) a rotatable cutter head including a lawn cutting string mounted thereon and a main shaft extending upward therefrom;

(b) a moving member including a fastener secured to said main shaft of said cutter head for movably supporting said cutter head;

(c) a reconfigurable auxiliary member coupled to said main shaft of said cutter head to extend radially therefrom in pivotally adjustable manner for maintaining an adjustable radial clearance at an adjustable angular position relative to said cutter head, said auxiliary member including a mounting bracket coaxially engaging said fastener of said moving member, a guide track secured on said mounting bracket, and an auxiliary moving wheel coupled in radially adjustable manner to said guide track; and, (d) an adjusting member mounted on said mounting bracket of said auxiliary member for releasably securing said mounting bracket to said fastener of said moving member.

8. The line trimmer as recited in claim 7 wherein said fastener includes a first clamping block and a second clamping block secured one to the other about said main shaft.

9. The line trimmer as recited in claim 8 wherein said moving member further includes:

a pair of angularly spaced extension legs each extending from one of said first clamping blocks, each said extension leg having a roller coupled to a terminal end thereof; and, a guard plate extending between said extension legs.

* * * * *